Feb. 8, 1944. G. L. STERNFIELD ET AL 2,341,340
FEEDING AND MEASURING DEVICE AND METHOD
Filed April 15, 1941 4 Sheets-Sheet 3

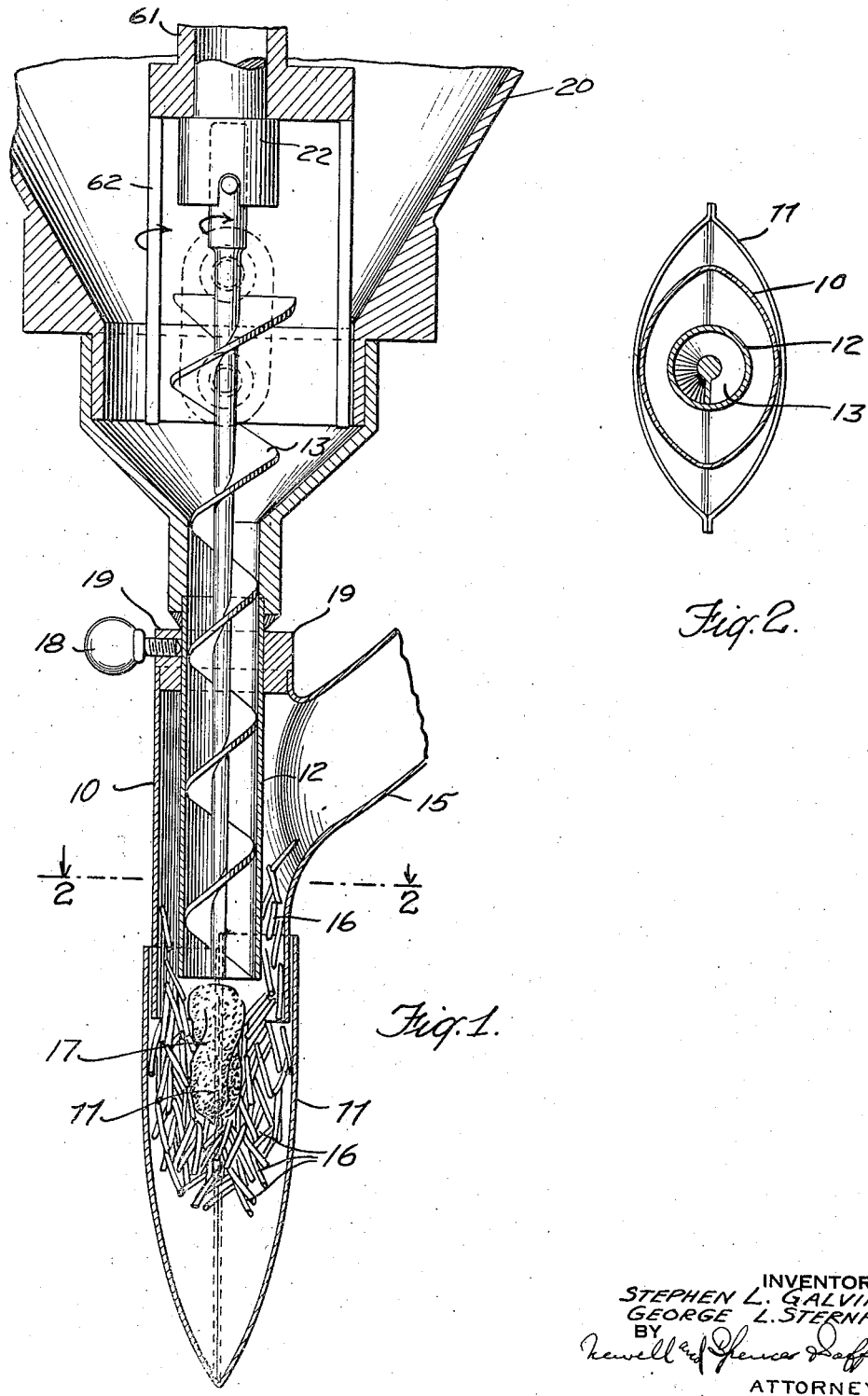

INVENTORS
STEPHEN L. GALVIN.
GEORGE L. STERNFIELD.
BY
ATTORNEYS

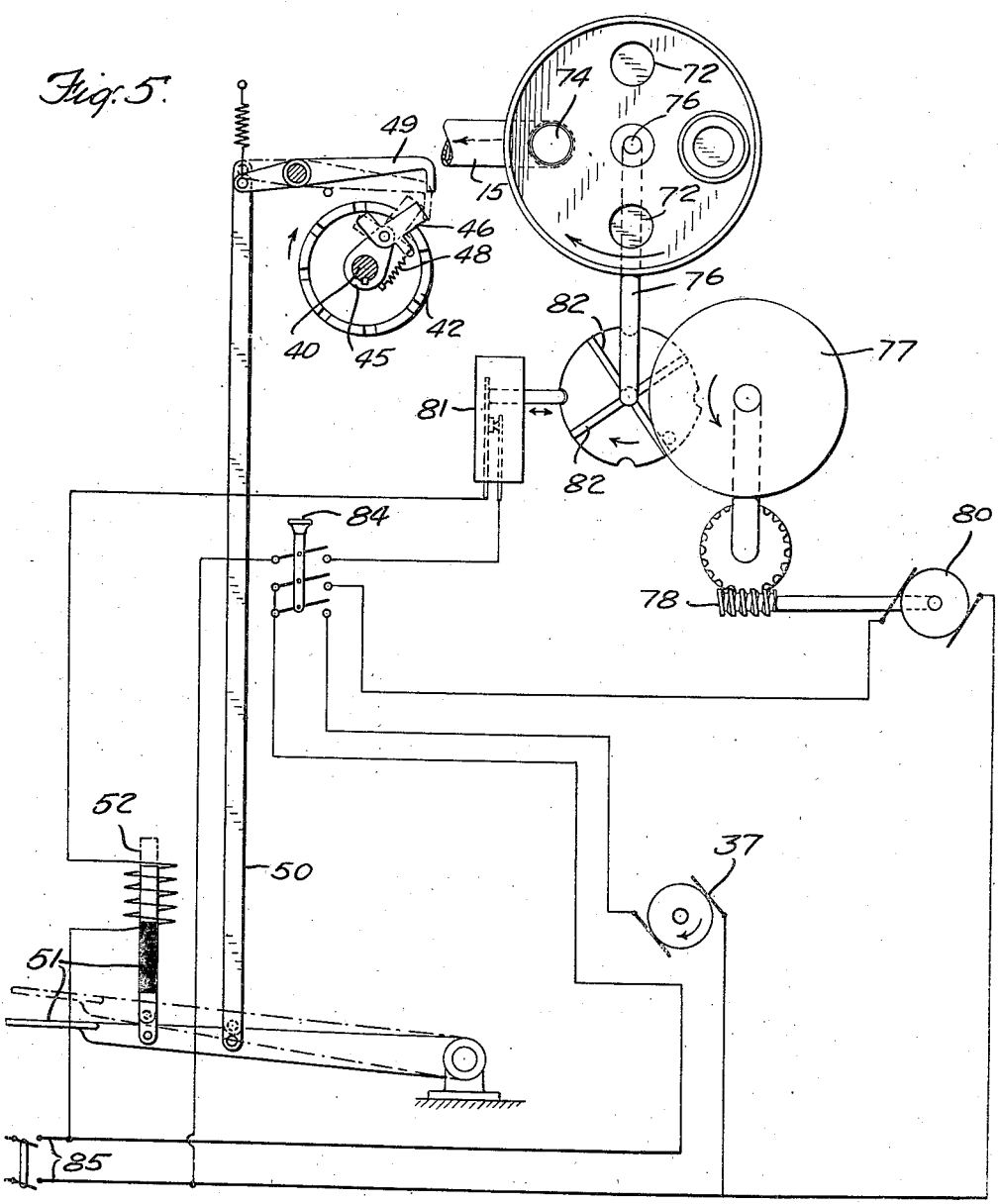

Patented Feb. 8, 1944

2,341,340

UNITED STATES PATENT OFFICE 2,341,340

FEEDING AND MEASURING DEVICE AND METHOD

George L. Sternfield, New York, N. Y., and Stephen L. Galvin, North Bergen, N. J., assignors to Continental Foods, Inc., Hoboken, N. J., a corporation of Illinois Application April 15, 1941, Serial No. 388,596

7 Claims. (Cl. 226—58)

This invention relates to a device and method for feeding a number of materials of different natures into a common space. More particularly the invention relates to a device and method for feeding dry fluent material together with a more or less sticky plastic material.

In the packaging of various materials, of which we shall give a dehydrated soup composition as an example, it is necessary to include in a single package a certain amount of dry materials and a certain amount of plastic and more or less sticky materials, or in some cases liquid which, being taken up by certain of the solid ingredients, form a plastic and more or less sticky mass. These latter materials present difficulties during the feeding operation and during subsequent handling of the package because of the tendency of the material to deposit masses of the material on the various surfaces with which they may come in contact during the feeding operation. And, if care is not taken to protect the walls of the package, a certain amount of this material may adhere to surfaces which are intended subsequently to be sealed together and may interfere with proper sealing. Even where feeding nozzles have been provided projecting into the package with the intent of protecting the walls of the package it has been found that the sticky material tends to adhere to the edges of the nozzle and eventually to work up on the outside of the nozzle where it may still come in contact with the walls of the package. Moreover, this tendency to adhere to the edges of the walls of the feeding device may result in destroying the accuracy of the measurement of the amounts which are being fed into successive packages. A certain amount of the sticky material may be withheld from each package by adhering to the edges or inner surfaces of feeding nozzles; subsequently when the adhering material has built up to a substantial amount the mass may break loose and result in an excessive amount of the material being delivered into one package.

We have now found that this can be prevented and the surfaces kept clean at all times, and the measurements accurate by properly correlating the feeding of the dry material and the sticky plastic material, and especially by the novel design of feeding devices to secure such correlation, as will be more fully explained below.

We have also found, as set forth in our copending application, Serial No. 388,597, filed herewith, that a similar disadvantage may occur when the material is used if the sticky material is allowed to adhere to the inner surface of the package; and we have found that by a proper correlation of the feeding of dry and sticky materials, as hereinafter set forth, these disadvantages may be avoided and the package described and claimed in our copending application above-identified, can be easily and automatically produced.

Accordingly, it is one object of the present invention to provide a feeding and proportioning device which will at all times maintain accurate proportions.

It is another object of the invention to provide a feeding device for dry materials and plastics which will at all times be self-cleaning.

Another object of the invention is to provide a device for filling packages in which more or less sticky ingredients are prevented from coming in contact with the walls of the package.

Another object of the invention is to provide a device for filling packages with a dry and more or less sticky material which will automatically position the sticky material within the mass of dry material as supplied to the package.

Other objects and advantages of our invention will be apparent to those skilled in the art from the following description and the accompanying drawings.

Although we have described herein and shown in the accompanying drawings a preferred embodiment of our invention and certain modifications thereof, it will be understood that these are not intended to be exhaustive nor limiting of the invention, but on the contrary are chosen and set forth for the purpose of enabling others skilled in the art fully to understand the principles of the invention and their application in practical use, in order that others may utilize the invention with any of numerous modifications and in various forms each as may be best adapted to a particular use.

In the drawings:

Fig. 1 is a fragmentary view in vertical axial section of a feeding device embodying my invention;

Fig. 2 is a view in cross section taken on lines 2—2 of Fig. 1;

Fig. 5 is a diagrammatic view showing the electrical and mechanical interconnections by which the operation of the machine is controlled.

Figure 3:
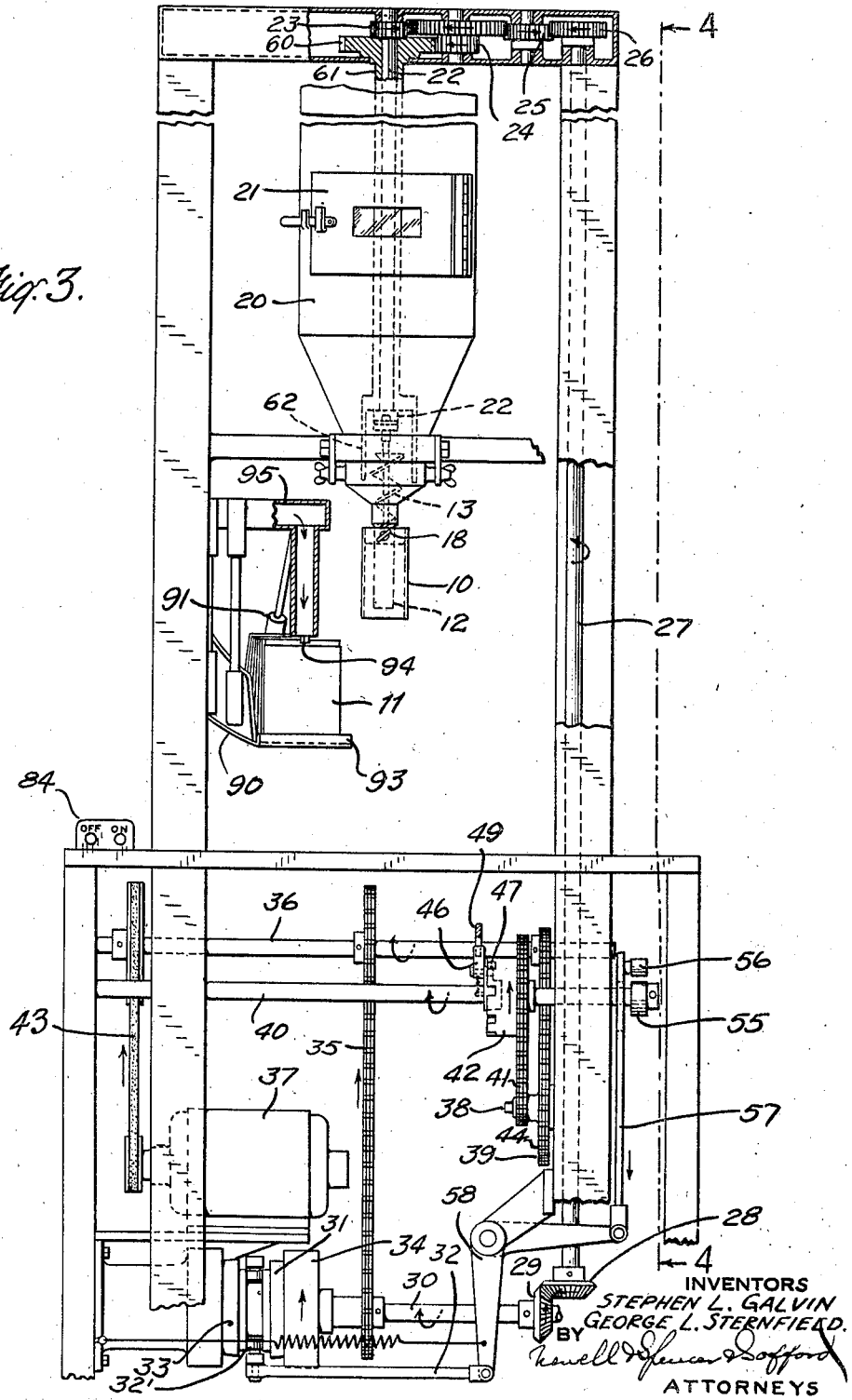
Fig. 3 is a view in front elevation on a smaller scale of a complete packaging machine including the structures shown in Figs. 1 and 2.

Referring first to Figs. 1 and 2, we have there shown the filling nozzle 10 in elliptical form over which a bag or envelope 11 or other form of package is to be slipped for filling, e. g., as shown in Figs. 1 and 2. Approximately centrally within the filling nozzle 10 is an extrusion nozzle 12 through which the plastic or other more or less sticky material is fed by means of the worm screw 13; and, opening into the filling nozzle 10 and directed diagonally downward toward the extrusion nozzle 12 and approximately along the plane of the minor axis of the elliptical nozzle 10, is a chute 15 through which the granular dry material may be fed by gravity into the filling nozzle 10. It is not essential that the chute 15 be aligned with the minor axis of the nozzle 10, but I have found that this gives a better distribution.

In Fig. 1, we have shown the parts near the end of a filling operation, the granular dry material, shown for example, as noodles 16, has for the most part fallen into the bag 11; in the center of the falling mass a slug of plastic material 17 has been extruded from the nozzle 12; and the last of the noodles or other dry material are falling through the filling nozzle 10 above the slug 17 of plastic material, so that as the bag is filled the slug 17 will be entirely enclosed in a mass of dry noodles; and likewise, as will be observed, the noodles falling through the narrow space between the filling nozzle 10 and the extrusion nozzle 12 have effected a scouring of the lower end of the extrusion nozzle 12 along its outer surface down to its lower edge and also along the inner surface of the filling nozzle 10, so that these surfaces are kept clean by this scouring action of the dry material in falling through between them.

The spacing of the filling nozzle 10 from the extrusion nozzle 12 and the respective lengths of the major and minor axis of the elliptical section of the filling nozzle 10 are shown to scale for a preferred embodiment and in any case are chosen so that the noodles pass in part around the extrusion nozzle on both sides, a part falling downward from the mouth of the chute 15, a part falling on each side, and a part passing on each side to the back. Thus a substantially circumferential distribution of the material falling through the filling nozzle 10 is secured, with consequent scouring of all sides of the extrusion nozzle 12.

As shown in Fig. 1, the feeding and proportioning device just described may be applied onto a standard extruding device, e. g., by means of the collar 19 and set screw 18. This device, shown in fragmentary sectional view in Fig. 1, is illustrated in greater detail in Figs. 3 to 5 inclusive. A reservoir 20 is provided into which the plastic material may be fed, e. g., through a door 21, from which the material falls by gravity and by action of the stirring rods 62 and the upper portion of the worm screw 13 into the extrusion nozzle 12.

The worm screw 13 is operated intermittently by the shaft 22, gearing 23, 24, 25, 26, shaft 27, miter gears 28, 29, shaft 30 and the clutch 31. The clutch member 31 slidably keyed to the shaft 30 is movable longitudinally thereon by the rod 32 and linkage connected therewith so as to engage the clutch 31 at one end of its movement and to engage the brake 33 at the opposite end of its movement. Thus, the operation of the worm screw 13 is started and stopped almost instantaneously at the proper times and the amount of material extruded is thus accurately guaged.

The female members 34 of the clutch 31 is driven, e. g., through the sprocket chain 35 from the jack shaft 36, which in turn, is driven by the motor 37. A stud shaft 38 below the shaft 36 carries a double sprocket 39 connected, e. g., by sprocket chains as shown to the shaft 36 and the clutch member 42 on the control shaft 40 respectively.

The drive from the motor 37 is successively through the belt 43, the shaft 36, the chain and sprocket drive connection 35 to the clutch member 34 which runs free on the shaft 30 so long as the clutch is disengaged, and a parallel drive for the control shaft 40 and the parts driven thereby is taken from the shaft 36 through the sprocket chain 44 to the double sprocket 39 and thence back through the sprocket chain 41 to the clutch member 42. All these parts to and including the clutch members 34 and 42 operate continuously while the machine is in use; but, as already indicated, the shaft 30 is operated only when the clutch 42 is engaged, as will be presently described.

A pawl 46 on a hub 45 is secured on the shaft 40 to rotate therewith and located adjacent the clutch member 42, as most clearly shown in Fig. 3 and the upper portion of Fig. 5. The pawl 46 carries an arm 47 which normally is held just below the inner face of the clutch member 42, but the pawl is urged by the spring 48 so that as soon as it is released from the detent 49 by operation either of the treadle 51 or solenoid 52 acting through the link 50, the arm 47 engages in one of the notches in the periphery of the clutch member 42. The shaft 40 is thereby engaged to rotate the cam 55 on its end into engagement with the cam roller 56, which through the link 57 and the bell crank 58 and the link 32 already mentioned, operates the slide member 31, 33 to release the brake and engage the clutch and thereby to rotate the shaft 30 and the remainder of the drive mechanism for the worm screw 13.

If the treadle bar 51 is released before the end of a single revolution, the detent 49 drops back into place, pulls the pawl 46 out of engagement with the clutch member 42 and thus limits the operation to that accomplished during a single revolution of the cam 55.

The double gear 24 in addition to engaging the pinion 23 and the end of the drive shaft 22 for the worm screw 13 also engages the pinion 60 on the end of the tubular shaft 61 by which the agitators 62 are rotated to keep the material stirred and shaken down around the worm screw 13.

It will be understood that the mechanism just described and to be more fully described below has been chosen as a convenient mechanism for the purpose of feeding a material into the package and through the device of our invention, but that our invention is in no way limited to the use of this particular apparatus or type of apparatus.

Figure 4:
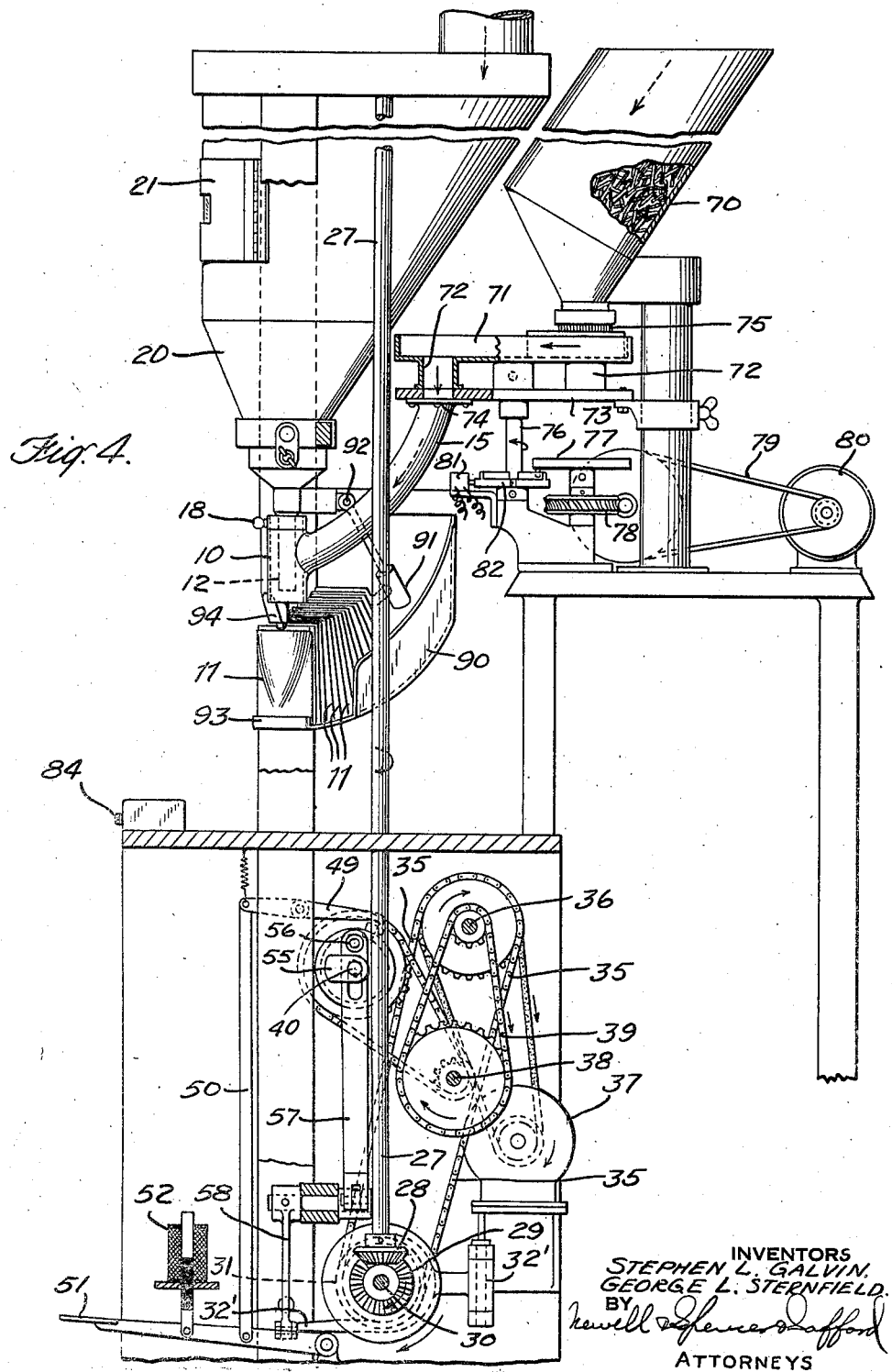
Fig. 4 is a view partly in side elevation and partly in section taken on line 4—4 of Fig. 3.

Referring now more particularly to Fig. 4, we have shown the chute 15 leading to the filling nozzle 10 from a measuring mechanism designed for measuring out a predetermined quantity of dry material for each package from a reservoir 70. This measuring device consists of a rotating table 71 having a plurality (4 in the present instance) of measuring cups 72 formed therein integral at their upper edges with the table 71 and fitted at their lower edges on the stationary table 73 which is provided with a single opening 74 registering with the mouth of the chute 15 and at a point removed from the position in which the cups 72 come into alignment with the mouth of the reservoir 70.

Around the mouth of the reservoir 70 and forming a flexible annular closure therefor is an annular brush 75 which serves to sweep the dry material off to the proper level as each cup in turn is moved away after being filled by the dry material falling into it while it is in register with the mouth of the reservoir 70.

As the table 71 continues to rotate, it fills the cups 72 and subsequently comes into register with the chute 15 whereupon its charge of the dry material is dumped into the chute 15 and thence down through the filling nozzle 10 and into the package. An agitating or vibrating device may be used in connection with the reservoir 70 to assure constant and proper feeding of the dry materials and avoid "arching" of the materials at any time in the reservoir.

The table 71 is driven through the intermittently operating shaft 76 by the Geneva gear 77, the worm and wheel 78 and the belt 79 from the motor 80.

Although it is feasible for an operator to coordinate the timing of the plastic feeding operation with the timing of the feeding and measuring of the dry materials by operating the treadle 51 each time that a cup 72 dumps its noodles into the chute 15 the operator can easily recognize the proper moment for depressing the treadle 51 by the sound of the dry material falling through the chute 15. Nevertheless, we have found it more desirable to automatically interconnect the operation of these two so that perfect correlation for proper placing of the slug of plastic material within the mass of dry material will be assured for each package.

This we have accomplished in the case illustrated in the drawings by means of the micro switch 81, engaging the cam 82, connected as shown in Fig. 4 to the shaft 76, so that this switch is closed each time that a cup 72 comes into position over the chute 15, and is open between such operations. This micro switch 81 in turn controls the circuit of the solenoid 52 whereby the clutch mechanism is operated for controlling the operation of the plastic feeding device, already described.

A master switch 84 is connected in series with the micro switch 81 in the solenoid circuit, and at the same time controls the operating circuits of the two motors 37 and 80, whereby the operator may shut down the machine entirely. Obviously, instead of using a three-contact switch at 84, as shown in this diagram, a single switch in the supply leads 85 may be used for the same purpose.

In the case illustrated in the drawings, we have also provided adjacent the feeding nozzle 10, a device for feeding and opening the bags or envelope packages 11. This device as shown consists of the inclined ramp 90 in which the envelopes are stacked, as shown, the weight 91 freely pivoted at 92 on the frame of the device so that in tending to swing downward it urges the bags forward against the end 93 of the ramp, and the air nozzle 94 directly above the end 93 and spaced therefrom so that it catches on the rear edge of the bag, which is slightly higher than the front edge. Thus the stack of bags is held back between the nozzle 94 and the edge 93 while the air escaping through the nozzle 94 blows the bag open ready for filling. The operator may then remove the open bag and slip it directly over the filling nozzle 10, doing this in rapid succession as each in turn is filled.

The air for the bag opening nozzle 94 is supplied through a conduit 95 from a blower, e. g., driven by the motor 80 through suitable connections, the blower in this case being positioned behind the ramp 90 and, therefore, not shown in the drawings.

What we claim is:

1. In a device for filling into packages a dry granular material and a plastic, a reservoir for the plastic, means for extruding the plastic including a downwardly directed nozzle, a reservoir for the dry granular material, a continuously operating device for repeatedly accumulating a predetermined quantity of the dry material and dumping said quantity en masse, a switch responsive to said dumping operation for energizing the extruding means to cause it to extrude a predetermined quantity of plastic, and a conduit for guiding said dry material to and around said nozzle, whereby the plastic is extruded into a falling mass of plastic.

2. A device as defined in claim 1, in which the end of said conduit is of narrow substantially elliptical form approximately concentric with and narrowly spaced from the extruding nozzle whereby an envelope package may readily be fitted over the end of said conduit to receive therein a measured supply of said materials.

3. A device as defined in claim 1, in which the end of said conduit is of narrow substantially elliptical form approximately concentric with and narrowly spaced from the extruding nozzle whereby an envelope package may readily be fitted over the end of said conduit to receive therein a measured supply of said materials, and the conduit above said end is at an angle thereto extending obliquely upward and approximately in the minor axis plane of the eliptical portion whereby the falling stream of granular material is distributed on all sides of the nozzle.

4. In a device for filling containers with a dry granular material and a plastic, a reservoir for plastic material, means for extruding a measured amount of plastic material, a reservoir for dry granular material, means for supplying measured amounts of dry granular material at substantial velocity to and around the point of extrusion of the plastic material, and means responsive to each actuation of the supplying means for operating the extruding means in timed relation therewith to eject a slug of plastic material into the approximate center of the measured quantity of dry granular material, whereby the granular material will surround the extruded plastic material in the container while the velocity of the granules will cause them to have a scrubbing action at the point of extrusion of the plastic extruding means.

5. In a filling device, a downwardly directed filling nozzle adapted to discharge into a container, a downwardly directed extrusion nozzle within said filling nozzle, spaced therefrom on all sides, and terminating short of the end of said filling nozzle, a port in said filling nozzle disposed above the end of the extrusion nozzle, means for supplying measured amounts of dry free flowing granules at substantial velocity through said port, and means coordinated with said supplying means for momentarily extruding plastic through said extrusion nozzle after the first and before the last of the discharged granules have passed through said filling nozzle, whereby the granules will surround the extruded plastic material in the container while the velocity of the granules will cause them to have a scrubbing action with respect to the discharge end of the extrusion nozzle.

6. In a filling device, a downwardly directed filling nozzle of elliptical form adapted to discharge into a container, a downwardly directed extrusion nozzle within said filling nozzle, spaced therefrom on all sides, and terminating short of the end of said filling nozzle, a chute for the delivery of dry free flowing granules directed downwardly toward and into said filling nozzle, toward the side of the extrusion nozzle and substantially above its end, said chute being of appreciable length and of substantially uniform cross sectional area to permit free flow therethrough, means for supplying measured quantities of dry free flowing granules at the upper end of said chute to fall unimpeded therethrough and be discharged into the filling nozzle at substantial velocity to have a scrubbing action on the extrusion nozzle, and means coordinated with said supplying means for momentarily extruding plastic through said extrusion nozzle after the first and before the last of the discharged granules have passed through said filling nozzle, whereby the granules will surround the extruded plastic in the container.

7. The method of filling containers with dry free flowing granules and a sticky plastic material which comprises extruding a measured amount of plastic through a nozzle, causing a measured amount of granules to pass in a stream of appreciable velocity over the exterior of the nozzle before, after and during the extrusion of the plastic so as to keep the nozzle scrubbed clean of plastic, and collecting the plastic surrounded by granules in a container.

GEORGE L. STERNFIELD.
STEPHEN L. GALVIN.